(12) United States Patent
Kim

(10) Patent No.: US 11,135,964 B2
(45) Date of Patent: Oct. 5, 2021

(54) APPARATUS AND METHOD FOR CONTROLLING INTELLIGENT HEADLAMP

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/891,753

(22) Filed: Jun. 3, 2020

(65) Prior Publication Data
US 2020/0398736 A1 Dec. 24, 2020

(30) Foreign Application Priority Data
Jun. 20, 2019 (KR) .................. 10-2019-0073410

(51) Int. Cl.
| | |
|---|---|
| *B60Q 1/08* | (2006.01) |
| *F21S 41/153* | (2018.01) |
| *F21V 23/04* | (2006.01) |
| *F21V 23/00* | (2015.01) |
| *F21S 41/663* | (2018.01) |
| *H05B 47/125* | (2020.01) |
| *B60R 11/04* | (2006.01) |

(Continued)

(52) U.S. Cl.
CPC .............. *B60Q 1/08* (2013.01); *B60R 11/04* (2013.01); *F21S 41/153* (2018.01); *F21S 41/663* (2018.01); *F21V 23/003* (2013.01); *F21V 23/0478* (2013.01); *H05B 45/10* (2020.01); *H05B 47/125* (2020.01); *F21W 2102/10* (2018.01); *F21W 2107/10* (2018.01); *F21Y 2115/10* (2016.08)

(58) Field of Classification Search
CPC .. H05B 47/105; H05B 47/115; H05B 47/125; B60Q 1/143; B60Q 1/1423; B60Q 9/005; B60Q 9/008
See application file for complete search history.

(56) References Cited

U.S. PATENT DOCUMENTS

| | | | |
|---|---|---|---|
| 2004/0021853 A1* | 2/2004 | Stam | G01J 1/32 356/218 |
| 2015/0109444 A1* | 4/2015 | Zhang | H04N 7/188 348/148 |

(Continued)

FOREIGN PATENT DOCUMENTS

KR 10-2016-0011757 A 2/2016

*Primary Examiner* — Tung X Le
(74) *Attorney, Agent, or Firm* — NovoTechIP International PLLC

(57) ABSTRACT

An apparatus for controlling an intelligent headlamp may include: a capturing unit configured to capture a forward image of a vehicle; a lamp driving unit configured to independently drive LEDs of a headlamp configured as a matrix LED; a storage unit configured to store an initial origin point, a changed origin point and an offset for adjusting the position of the headlamp; and a control unit configured to control the lamp driving unit to turn on the headlamp, detect an origin point from the forward image inputted from the capturing unit, set the offset for adjusting the position of the headlamp by comparing the detected origin point to the initial origin point or the changed origin point stored in the storage unit, and store a changed origin point, newly set based on the detected origin point, and the offset in the storage unit.

13 Claims, 10 Drawing Sheets

(51) Int. Cl.
*H05B 45/10* (2020.01)
*F21W 107/10* (2018.01)
*F21Y 115/10* (2016.01)
*F21W 102/10* (2018.01)

(56) References Cited

U.S. PATENT DOCUMENTS

2015/0181679 A1* 6/2015 Liao .................... H05B 47/125
                                                    315/291
2019/0071013 A1* 3/2019 Adam .................... B60W 40/04
2021/0016705 A1* 1/2021 Hartisch .............. G01M 11/065

* cited by examiner offset : (0,0)

offset : (+1,−1)

FIG. 6A

APPARATUS AND METHOD FOR CONTROLLING INTELLIGENT HEADLAMP

CROSS-REFERENCE TO RELATED APPLICATION

This application claims priority from and the benefit of Korean Patent Application No. 10-2019-0073410, filed on Jun. 20, 2019, which is hereby incorporated by reference for all purposes as if set forth herein.

BACKGROUND

Field

Exemplary embodiments of the present disclosure relate to an apparatus and method for controlling an intelligent headlamp, and more particularly, to an apparatus and method for controlling an intelligent headlamp, which can individually control LEDs of a headlamp configured as a matrix LED, detect a change in position of the matrix LED in the intelligent headlamp which blocks light of a local area according to a forward situation, and automatically correct the position.

Discussion of the Background

In general, a vehicle includes a lighting system which is used to enable a driver to see an object well in a driving direction during night driving, or used to inform another vehicle or other road users of the driving state of an ego vehicle.

The lighting system is a headlamp which is also referred to as a headlight, and functions to illuminate a forward path on which the vehicle travels. The lighting system requires such brightness that enables a driver to check an obstacle on the road, which is located at a distance of 100 m ahead of the vehicle in the night time.

The conventional headlamp for a vehicle provides a driver with lighting in a fixed direction, regardless of a road state and a vehicle state which change in various manners.

Recently, headlamps for a vehicle are evolving from a method for passively illuminating the road to a method for actively illuminating the road in response to road and surrounding environments. For example, the method for actively illuminating the road provides bright light on a dark road, and provides dark light on a bright road. Furthermore, a method capable of minimizing glare of a driver in an oncoming vehicle is also applied.

In particular, among intelligent headlamp systems on which research is actively conducted, an ADB (Adaptive Driving Beam) headlamp system is a camera-linked headlamp system. When a camera mounted at the front of a vehicle recognizes no forward vehicle or oncoming vehicle, the ADB headlamp system emits a high beam. However, when the camera recognizes the forward vehicle or oncoming vehicle, i.e. a light source, the ADB headlamp system locally blocks light to emit a low beam onto the area of the forward vehicle or oncoming vehicle and to emit a high beam onto the other area.

Therefore, the ADB headlamp system can improve the forward visibility of a driver in an ego vehicle, and prevent glare of a driver in a forward vehicle or oncoming vehicle.

The related art of the present disclosure is disclosed in Korean Patent Application No. 10-2016-0011757 published on Feb. 2, 2016 and entitled "Apparatus for Controlling Adaptive Driving Beam Headlamp and Method Thereof".

The ADB headlamp system checks the position of a forward vehicle through the camera, and locally forms a dark area by turning off an LED corresponding to the position based on the check result. However, when the position of the LED is distorted due to vibration of the vehicle or the like, the dark area may be formed at an undesired position.

SUMMARY

Various embodiments are directed to an apparatus and method for controlling an intelligent headlamp, which can individually control LEDs of a headlamp configured as a matrix LED, detect a change in position of the matrix LED in the intelligent headlamp which blocks light of a local area according to a forward situation, and automatically correct the position.

In an embodiment, an apparatus for controlling an intelligent headlamp may include: a capturing unit configured to capture a forward image of a vehicle; a lamp driving unit configured to independently drive LEDs of a headlamp configured as a matrix LED; a storage unit configured to store an initial origin point, a changed origin point and an offset for adjusting the position of the headlamp; and a control unit configured to control the lamp driving unit to turn on the headlamp, detect an origin point from the forward image inputted from the capturing unit, set the offset for adjusting the position of the headlamp by comparing the detected origin point to the initial origin point or the changed origin point stored in the storage unit, and store the offset and a changed origin point, newly set based on the detected origin point, in the storage unit.

When turning on the headlamp, the control unit may turn on the headlamp to emit light in a preset pattern, in order to detect the origin point.

The control unit may turn on an origin point light source included in the headlamp, and then detect the origin point based on the position of the origin light source.

The origin point light source may be installed to emit light outside a low-beam area of the headlamp.

The control unit may store the changed origin point, newly set based on the detected origin point, according to a result obtained by comparing a position, set by the offset between the initial origin point and the detected origin point, to a position set by the offset between the changed origin point and the detected origin point.

The control unit may output an error message through an output unit, when the detected origin point deviates from a capturing area of the capturing unit.

The control unit may detect the position of the vehicle in the forward image inputted from the capturing unit, and then controls the lamp driving unit to drive the headlamp based on a position calculated by applying the offset stored in the storage unit.

In an embodiment, a method for controlling an intelligent headlamp may include: controlling, by a control unit, a lamp driving unit to turn on a headlamp; detecting, by the control unit, an origin point from a forward image inputted from a capturing unit; setting, by the control unit, an offset for adjusting the position of the headlamp by comparing the detected origin point to an initial origin point or a changed origin point stored in a storage unit; and storing, by the control unit, the set offset and a changed origin point, newly set based on the detected origin point, in the storage unit.

The controlling of the lamp driving unit to turn on the headlamp may include turning on, by the control unit, the headlamp to emit light in a preset pattern, in order to detect the origin point.

The controlling of the lamp driving unit to turn on the headlamp may include turning on, by the control unit, an origin point light source included in the headlamp.

The storing of the set offset and the changed origin point may include storing, by the control unit, the detected origin point as the changed origin point, according to a result obtained by comparing a position, set by the offset between the initial origin point and the detected origin point, to a position set by the offset between the changed origin point and the detected origin point.

The setting of the offset may include outputting, by the control unit, an error message through an output unit, when the detected origin point deviates from a capturing area of the capturing unit.

The method may further include detecting, by the control unit, the position of the vehicle in the forward image inputted from the capturing unit, and then controlling the lamp driving unit to drive the headlamp, based on a position calculated by applying the offset stored in the storage unit.

The apparatus and method for controlling an intelligent headlamp in accordance with the embodiment of the present disclosure may individually control the LEDs of the headlamp configured as the matrix LED, detect a change in position of the matrix LED in the intelligent headlamp which blocks light of a local area according to a forward situation, and automatically correct the position, thereby not only improving stability by preventing glare caused by a malfunction, but also reducing the time and cost required for a minute correction operation.

BRIEF DESCRIPTION OF THE DRAWINGS

FIGS. 4A-4b, 5, 6A and 6B are diagrams for describing an operation of setting an offset according to a shift of the origin point in the apparatus for controlling an intelligent headlamp in accordance with the embodiment of the present disclosure.

DETAILED DESCRIPTION OF THE ILLUSTRATED EMBODIMENTS

Figure 1:
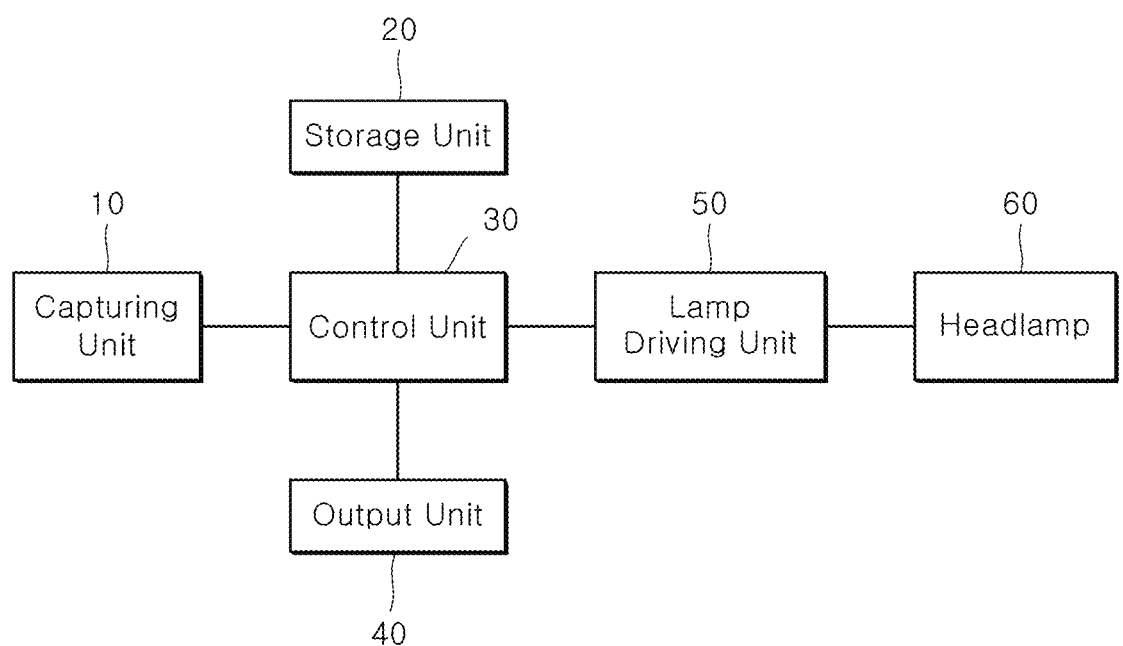
FIG. 1 is a block diagram illustrating an apparatus for controlling an intelligent headlamp in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for controlling an intelligent headlamp will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
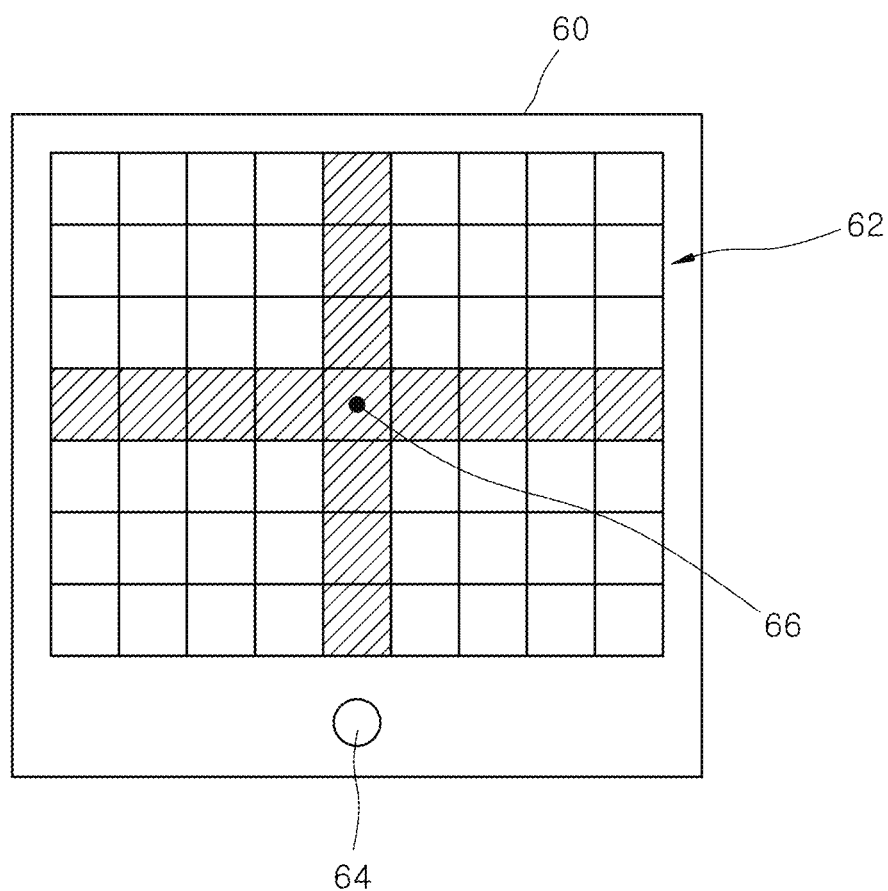
FIG. 2 is a diagram illustrating a headlamp in the apparatus for controlling an intelligent headlamp in accordance with the embodiment of the present disclosure.
Figure 4A:
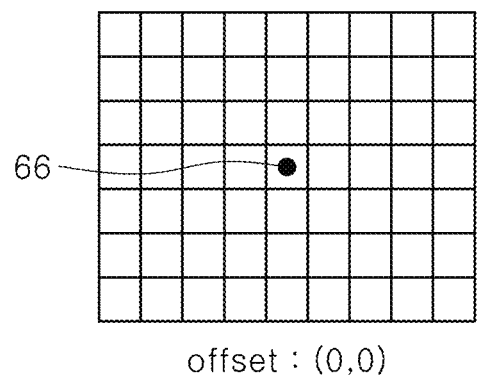
Figure 4B:
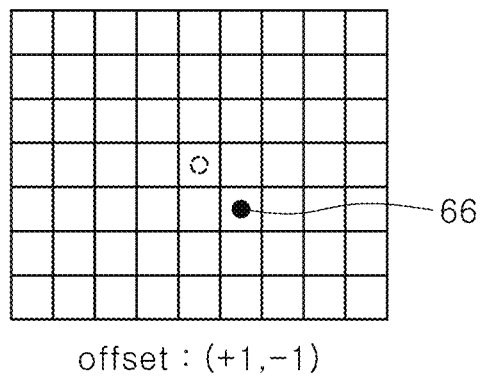
Figure 5:
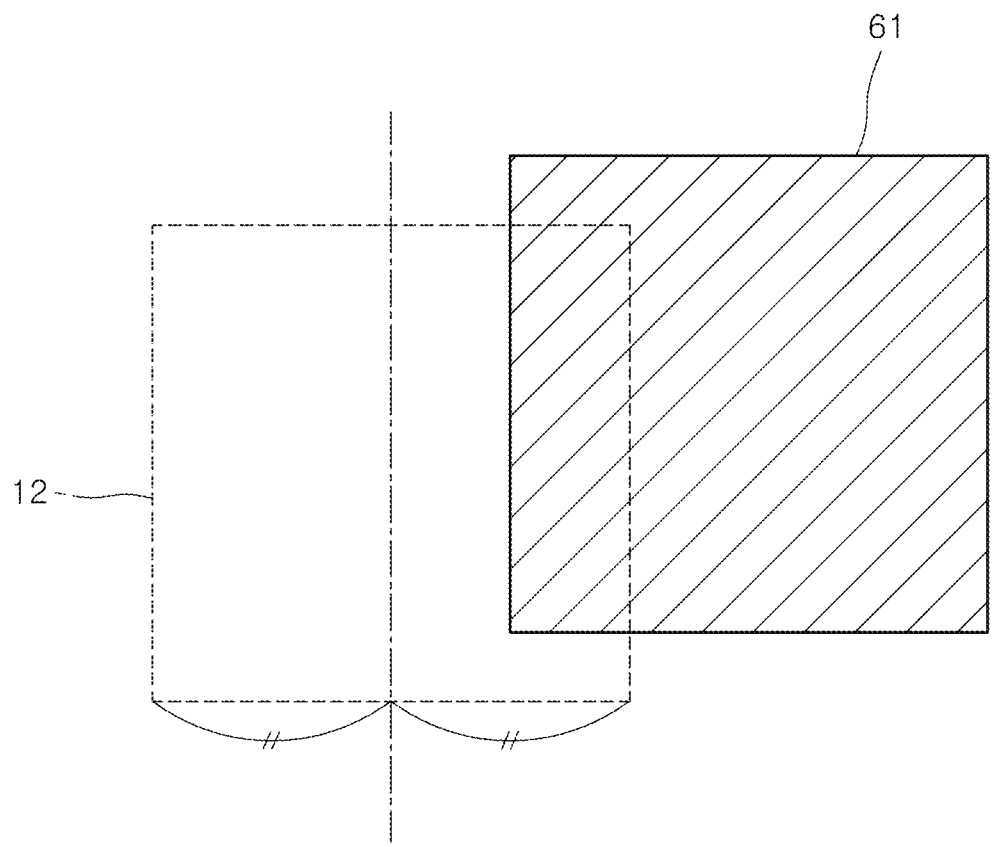

FIG. 1 is a block diagram illustrating an apparatus for controlling an intelligent headlamp in accordance with an embodiment of the present disclosure, FIG. 2 is a diagram illustrating a headlamp in the apparatus for controlling an intelligent headlamp in accordance with the embodiment of the present disclosure, FIG. 3 is a diagram for describing the installation position of an origin-point light source in the apparatus for controlling an intelligent headlamp in accordance with the embodiment of the present disclosure, and FIGS. 4 to 6 are diagrams for describing an operation of setting an offset according to a shift of the origin point in the apparatus for controlling an intelligent headlamp in accordance with the embodiment of the present disclosure.

As illustrated in FIGS. 1 and 2, the apparatus for controlling an intelligent headlamp in accordance with the embodiment of the present disclosure may include a capturing unit 10, a lamp driving unit 50, a storage unit 20, a control unit 30 and an output unit 40.

The capturing unit 10 may be installed at the top of a front windshield of a vehicle, and provide the control unit 30 with a forward image obtained by capturing a forward image of the vehicle.

The lamp driving unit 50 may independently drive LEDs of a headlamp 60 configured as a matrix LED 62, and block light by locally turning off a position area corresponding to a forward vehicle or oncoming vehicle.

The storage unit 20 may store an initial origin point, a changed origin point and an offset for adjusting the position of the headlamp 60.

The initial origin point indicates an origin point which is set when the headlamp 60 is initially installed, the changed origin point indicates an origin point which is changed through correction while the headlamp 60 is used, and the offset is a correction value for adjusting the position of the headlamp 60 in order to match the pixels of the forward image, captured through the capturing unit 10, with an emission area of the matrix LED 62 when the origin point is shifted.

The present embodiment will be described based on the state in which the origin-point light source is outputted to set the initial origin point, while the pixels of the forward image, captured through the capturing unit 10, are matched with the emission area of the matrix LED 62 of the headlamp 60 during the initial installation.

The control unit 30 may control the lamp driving unit 50 to turn on the headlamp 60, detect the origin point in the forward image inputted from the capturing unit 10, set an offset for adjusting the position of the headlamp 60 by comparing the detected origin point to the initial origin point or the changed origin point stored in the storage unit 20, and store the offset and the changed origin point, newly set based on the detected origin point, in the storage unit 20.

In order to detect the origin point when the headlamp 60 is turned on, the control unit 30 may independently control the matrix LED 62 in the headlamp 60 configured as illustrated in FIG. 2, and thus turn on the headlamp 60 to emit light in a preset pattern.

For example, while the vehicle is stopped, the control unit 30 may turn on the headlamp 60 to emit light in a cross-shaped pattern on a wall surface at a preset distance, in order to detect the origin point 66.

The control unit 30 may turn on an origin point light source 64 included in the headlamp 60, and detect the origin point based on the position of the origin point light source 64.

Figure 3A:
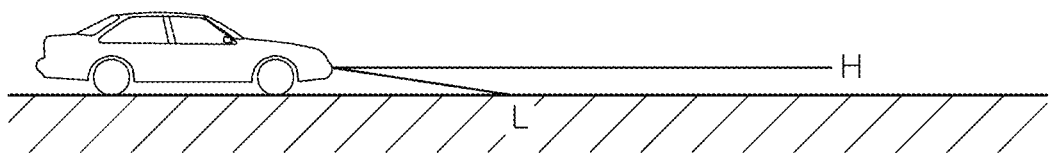
FIGS. 3A and 3B are diagrams for describing the installation position of an origin-point light source in the apparatus for controlling an intelligent headlamp in accordance with the embodiment of the present disclosure.

When the control unit 30 turns on the headlamp 60 to emit light as illustrated in FIG. 3A, the headlamp 60 may horizontally emit a high beam H, and emit a low beam L on the road surface.

Figure 3B:
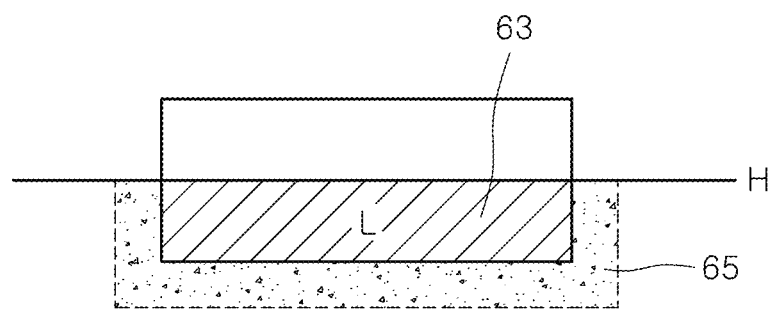

At this time, the origin point light source 64 illustrated in FIG. 2 may be installed as infrared ray or laser under the matrix LED 62 such that the origin point can be formed in an area 65 outside a low-beam area 63 as illustrated in FIG. 3B. When the origin point light source 64 is applied, the control unit 30 may turn on the origin point light source 64 to emit light onto the bottom surface during driving, in order to detect the origin point.

The origin point light source 64 may be independently provided separately from the matrix LED 62, or included in the matrix LED 62.

The control unit 30 may detect the origin point in the forward image, and compare the detected origin point to the initial origin point or the changed origin point stored in the storage unit 20, thereby setting the offset.

When the position of the origin point 66 in the pixels of the forward image is shifted from a position illustrated in FIG. 4A to a position illustrated in FIG. 4B under the supposition that an offset for the origin point 66 in FIG. 4A is (0, 0) and the origin point 66 is shifted as illustrated in FIG. 4B, the control unit 30 may set the offset to (+1, −1) to correct the position of the headlamp 60.

When setting the offset, the control unit 30 may compare a pixel size 12 and an emission area 61 of the unit LED. When the comparison result indicates that the overlap ratio between the pixel size 12 and the emission area 61 of the unit LED is equal to or less than a preset range of 50% corresponding to a half of the pixel size as illustrated in FIG. 5, the control unit 30 may set the offset.

In the present embodiment, the position correction is performed in units of LEDs. Thus, when setting the offset, the control unit 30 may set the offset to a position where more areas are included, in order to perform the position correction in units of LEDs.

Figure 6A:
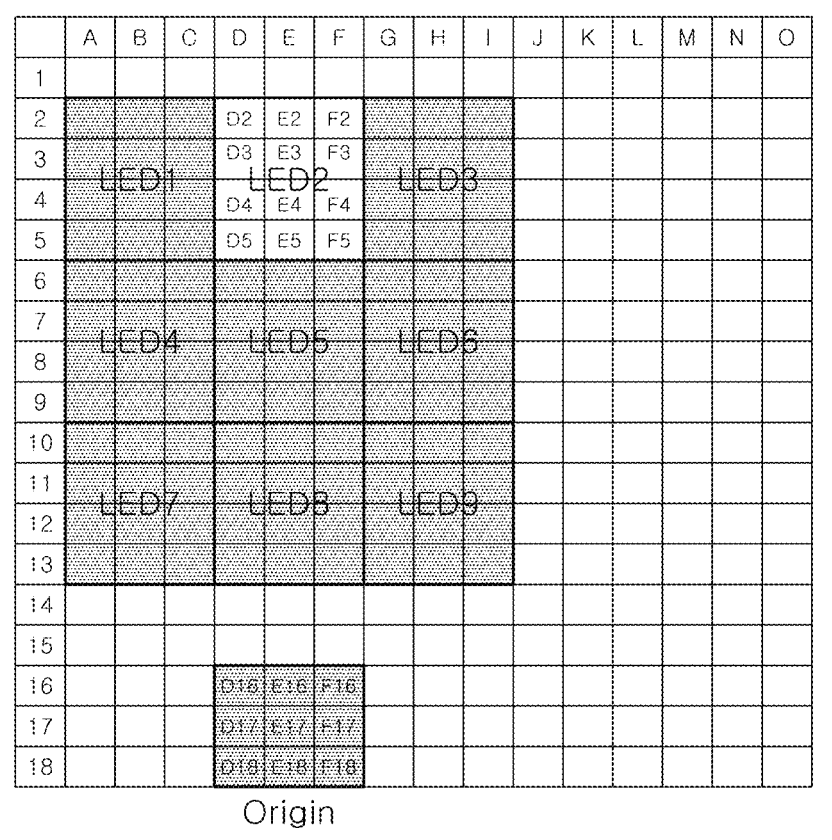
Figure 6B:
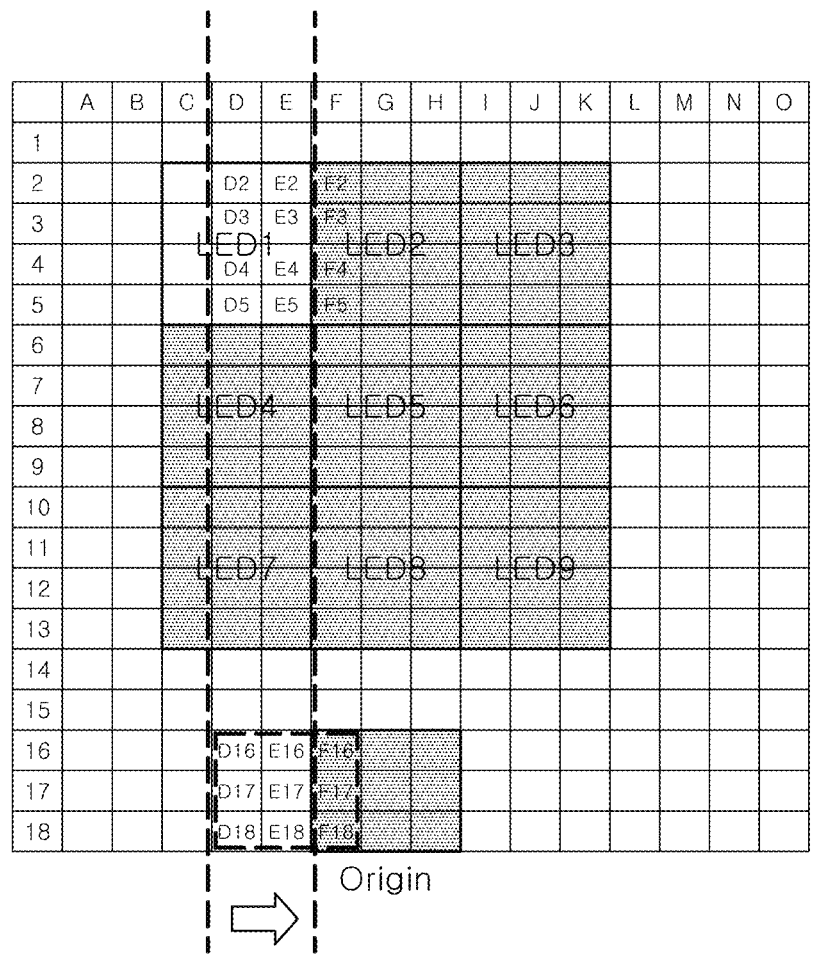

When the headlamp 60 is turned on and an LED LED2 is turned off as illustrated in FIG. 6A, light is not emitted onto pixel areas D2 to D5, E2 to E5 and F2 to F5 in a forward image, matched with the LED LED2. However, in order to control the headlamp 60 not to emit light onto the pixel areas D2 to D5, E2 to E5 and F2 to F5 in the forward image when the origin point is shifted by two pixels on the X-axis as illustrated in FIG. 6B, the control unit 30 may correct the position by setting an offset to turn off an LED LED1 including 50% or more of the pixel areas D2 to D5, E2 to E5 and F2 to F5.

When the changed origin point is stored or the correction is performed two or more times, the control unit 30 may compare a position, obtained by calculating and apply an offset between the origin point and the detected origin point, to a position obtained by calculating and applying an offset between the immediately previous changed origin point and the detected origin point. When the comparison result indicates that the positions coincide with each other, the control unit 30 may store the detected origin point as a changed origin point, and store the offset between the changed origin point and the detected origin point.

In the present embodiment, when the origin point is repeatedly corrected, the control unit 30 may determine the correction state through a cross check.

When the detected origin point deviates from the capturing area of the capturing unit 10, the control unit 30 may output an error message through the output unit 40, and thus inform the user that the intelligent headlamp 60 may malfunction.

After the automatic correction is performed, the control unit 30 may detect the position of the vehicle in the forward image inputted from the capturing unit 10, and then block light by controlling the lamp driving unit 50 to locally turn off the calculated position area of the headlamp 60, based on the position calculated by applying the offset stored in the storage unit 20, thereby preventing glare.

As described above, the apparatus for controlling an intelligent headlamp in accordance with the embodiment of the present disclosure may individually control the LEDs of the headlamp configured as the matrix LED, detect a change in position of the matrix LED in the intelligent headlamp which blocks light of a local area according to a forward situation, and automatically correct the position, thereby not only improving stability by preventing glare caused by a malfunction, but also reducing the time and cost required for a minute correction operation.

Figure 7:
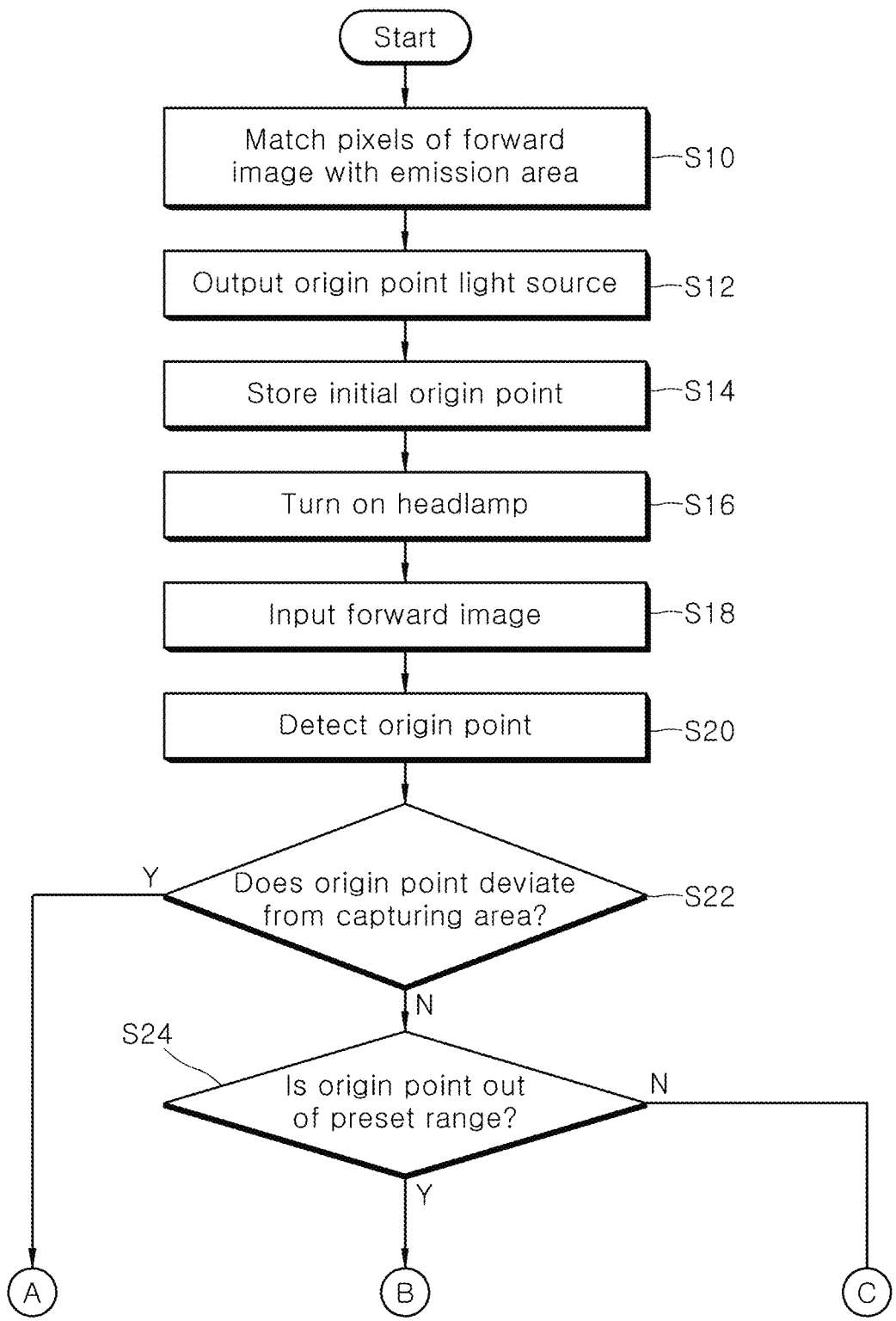
FIGS. 7 and 8 are flowcharts for describing a method for controlling an intelligent headlamp in accordance with an embodiment of the present disclosure.
Figure 8:
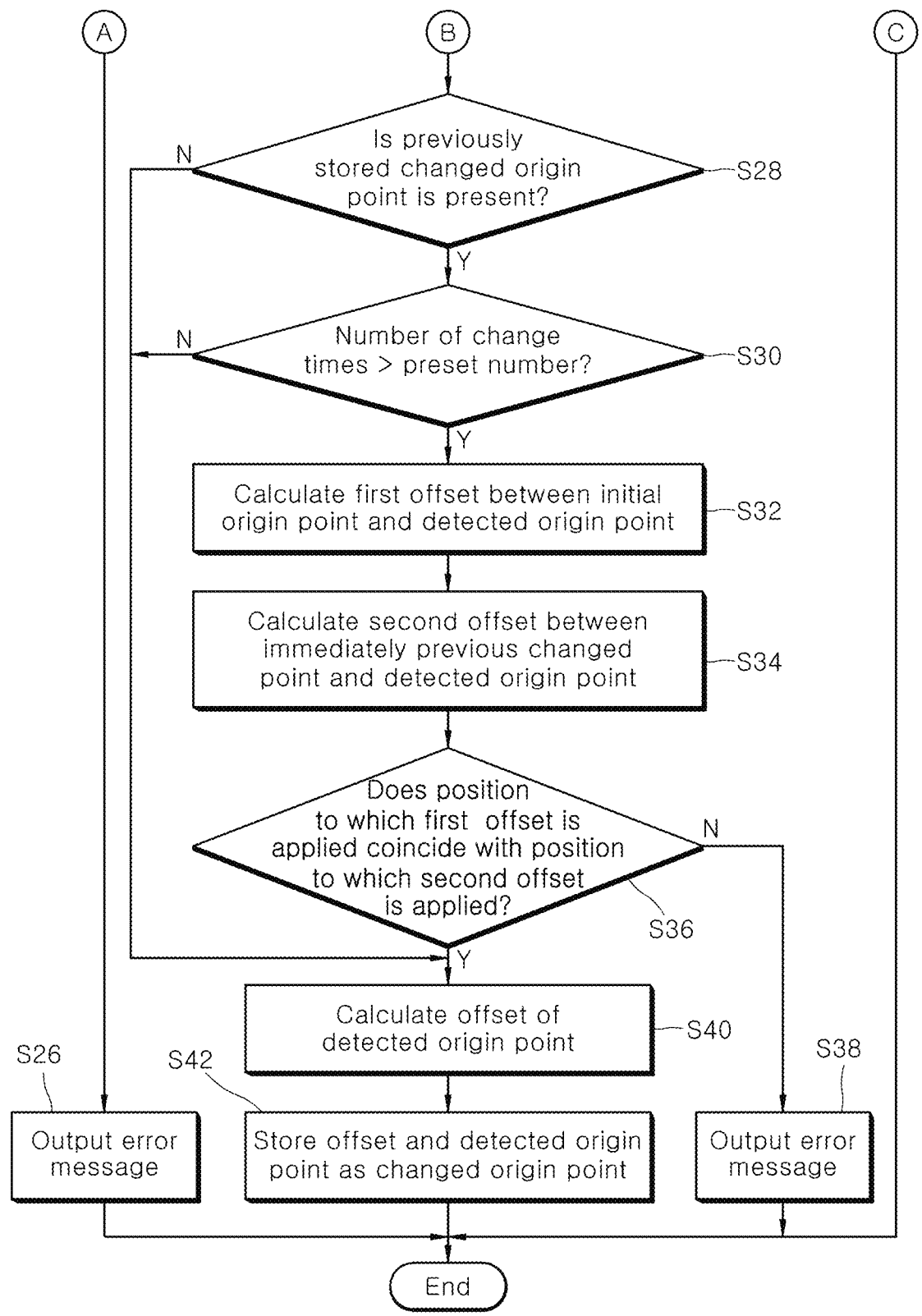

FIGS. 7 and 8 are flowcharts for describing a method for controlling an intelligent headlamp in accordance with an embodiment of the present disclosure.

As illustrated in FIGS. 7 and 8, the method for controlling an intelligent headlamp in accordance with the embodiment of the present disclosure starts with step S10 in which the control unit 30 matches pixels of a forward image, captured through the capturing unit 10, with an emission area of the matrix LED 62 of the headlamp 60 during the initial installation, in step S10.

After matching the pixels of the forward image with the emission area in step S10, the control unit 30 turns on the headlamp 60 to emit light in a preset pattern or output an origin point light source, in step S12.

After emitting light in the preset pattern or outputting the origin point light source in step S12, the control unit 30 may detect the origin point from the forward image inputted through the capturing unit 10, and store the initial origin point in the storage unit 20, in step S14.

While the vehicle is driven with the initial origin point set during the initial installation, the control unit 30 may control the lamp driving unit 50 to turn on the headlamp 60, in order to detect the origin point, in step S16.

When turning on the headlamp 60 in step S16, the control unit 30 may independently control the matrix LED 62 in the headlamp 60 configured as illustrated in FIG. 2, and thus turn on the headlamp 60 to emit light in the preset pattern.

The control unit 30 may turn on the origin point light source 64 included in the headlamp 60. When the origin point light source 64 is applied, the control unit 30 may turn on the origin point light source 64 to emit light onto the bottom surface during driving, in order to detect the origin point.

After turning on the headlamp 60 in step S16, the control unit 30 receives the forward image, captured through the capturing unit 10, from the capturing unit 10 in step S18.

After receiving the forward image in step S18, the control unit 30 detects the origin point from the forward image in step S20.

The control unit 30 may detect the origin point through the preset pattern or detect the origin point through the origin point light source 64.

After detecting the origin point in step S20, the control unit 30 determines that the origin point deviates from the capturing area, in step S22.

When the determination result of step S22 that the origin point deviates from the capturing area, it may indicate that the origin point is not detected from the forward image. In this case, the control unit 30 may output an error message through the output unit 40, and thus inform a user that the intelligent headlamp 60 may malfunction, in step S26.

On the other hand, when the determination result of step S22 that the origin point does not deviate from the capturing area, the control unit 30 compares the detected origin point to the initial origin point or the changed origin point stored in the storage unit 20, and determines whether the detected origin point is out of a preset range, in step S24.

When determining whether the detected origin point is out of the preset range, the control unit 30 may compare the pixel size 12 and the emission area 61 of the unit LED and determine whether the overlap ratio between the pixel size 12 and the emission area 61 of the unit LED is equal to or less than the preset range of 50% corresponding to a half of the pixel size as illustrated in FIG. 5.

When the detected origin point is not out of the preset range in step S24, the process is ended without changing the offset or the origin point.

When the detected origin point is out of the preset range in step S24, the control unit 30 determines whether the previously stored changed origin point is present in the storage unit 20, in step S28.

When the determination result of step S28 indicates that the previously stored changed origin point is not present, the control unit 30 calculates an offset for adjusting the position of the headlamp 60 through a difference between the initial origin point and the detected origin point, in step S40.

In the present embodiment, the position correction is performed in units of LEDs. Thus, when setting the offset, the control unit 30 may set the offset to a position where more areas are included.

After calculating the offset in step S40, the control unit 30 may store the calculated offset and a changed origin point, newly set based on the detected origin point, in the storage unit 20 such that the position of the vehicle and the position of the headlamp 60 are matched with each other when the intelligent headlamp is driven, in step S42.

Then, the control unit 30 may detect the position of the vehicle in the forward image inputted from the capturing unit 10, and block light by controlling the lamp driving unit 50 to locally turn off the calculated position area of the headlamp 60, based on the position calculated by applying the offset stored in the storage unit 20, thereby preventing glare.

When the determination result of step S28 indicates that the previously stored changed origin point is present, the control unit 30 may determine whether the number of times that the changed origin point is stored exceeds a preset number, in step S30.

In the present embodiment, when the number of times that the changed origin point is stored is high, for example, when the number of times that the changed origin point is stored exceeds two times, the control unit 30 may determine that correction has been frequently performed, and perform a cross check to determine whether correction or repair needs to be performed.

When the determination result of step S30 indicates that the number of times that the changed origin point is stored does not exceed the preset number, the control unit 30 calculates an offset for adjusting the position of the headlamp 60 through a difference between the changed origin point and the detected origin point in step S40.

When the determination result of step S30 indicates that the changed origin point is stored exceeds the preset number, the control unit 30 calculates a first offset between the detected origin point and the initial origin point stored in the storage unit 20, in step S32.

After calculating the initial offset in step S32, the control unit 30 calculates a second offset between the changed origin point and the immediately previous changed origin point stored in the storage unit 20, in step S34.

After calculating the first and second offsets in steps S32 and S34, the control unit 30 determines whether the position to which the first offset is applied coincides with the position to which the second offset is applied, in step S36.

When the determination result of step S36 indicates that the position to which the first offset is applied coincides with the position to which the second offset is applied, the control unit 30 determines that the position of the headlamp 60 is normally adjusted through the offset, and calculates the offset for adjusting the position of the headlamp 60 through a difference between the changed origin point and the detected origin point in step S40.

However, when the determination result of step S36 indicates that the position to which the first offset is applied dose not coincide with the position to which the second offset is applied, the control unit 30 may output an error message through the output unit 40, and thus inform a user that the intelligent headlamp 60 may malfunction, in step S38.

In the present embodiment, when the origin point is repeatedly corrected, the control unit 30 may determine the correction state through a cross check.

As described above, the method for controlling an intelligent headlamp in accordance with the embodiment of the present disclosure may individually control the LEDs of the headlamp configured as the matrix LED, detect a change in position of the matrix LED in the intelligent headlamp which blocks light of a local area according to a forward situation, and automatically correct the position, thereby not only improving stability by preventing glare caused by a malfunction, but also reducing the time and cost required for a minute correction operation.

The embodiments described in this specification may be implemented as a method or process, a device, a software program, a data stream or a signal, for example. Although the embodiments have been discussed in the context of a single implementation (for example, only as a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which facilitates communication of information between an end user and the processor.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a headlamp, comprising:
    a capturing unit configured to capture a forward image of a vehicle;
    a lamp driving unit configured to independently drive LEDs of the headlamp configured as a matrix LED;
    a storage unit configured to store an initial origin point, a changed origin point and an offset for adjusting the position of the headlamp; and
    a control unit configured to control the lamp driving unit to turn on the headlamp, detect an origin point from the forward image inputted from the capturing unit, set the offset for adjusting the position of the headlamp by comparing the detected origin point to the initial origin point or the changed origin point stored in the storage unit, and store the changed origin point, newly set to the detected origin point, and the offset in the storage unit.

2. The apparatus of claim 1, wherein when turning on the headlamp, the control unit turns on the headlamp to emit light in a preset pattern, in order to detect the origin point.

3. The apparatus of claim 1, wherein the control unit turns on an origin point light source included in the headlamp, and then detects the origin point based on the position of the origin light source.

4. The apparatus of claim 3, wherein the origin point light source is installed to emit light outside a low-beam area of the headlamp.

5. The apparatus of claim 1, wherein the control unit stores the changed origin point, newly set based on the detected origin point, according to a result obtained by comparing a position, set by the offset between the initial origin point and the detected origin point, to a position set by the offset between the changed origin point and the detected origin point.

6. The apparatus of claim 1, wherein the control unit outputs an error message through an output unit, when the detected origin point deviates from a capturing area of the capturing unit.

7. The apparatus of claim 1, wherein the control unit detects the position of the vehicle in the forward image inputted from the capturing unit, and then controls the lamp driving unit to drive the headlamp based on a position calculated by applying the offset stored in the storage unit.

8. A method for controlling a headlamp, comprising:
    controlling, by a control unit, a lamp driving unit to turn on the headlamp;
    detecting, by the control unit, an origin point from a forward image inputted from a capturing unit;
    setting, by the control unit, an offset for adjusting the position of the headlamp by comparing the detected origin point to an initial origin point or a changed origin point stored in a storage unit; and
    storing, by the control unit, the set offset and the changed origin point, newly set based on the detected origin point, in the storage unit.

9. The method of claim 8, wherein the controlling of the lamp driving unit to turn on the headlamp comprises turning on, by the control unit, the headlamp to emit light in a preset pattern, in order to detect the origin point.

10. The method of claim 8, wherein the controlling of the lamp driving unit to turn on the headlamp comprises turning on, by the control unit, an origin point light source included in the headlamp.

11. The method of claim 8, wherein the storing of the set offset and the changed origin point comprises storing, by the control unit, the detected origin point as the changed origin point, according to a result obtained by comparing a position, set by the offset between the initial origin point and the detected origin point, to a position set by the offset between the changed origin point and the detected origin point.

12. The method of claim 8, wherein the setting of the offset comprises outputting, by the control unit, an error message through an output unit, when the detected origin point deviates from a capturing area of the capturing unit.

13. The method of claim 8, further comprising detecting, by the control unit, the position of the vehicle in the forward image inputted from the capturing unit, and then controlling the lamp driving unit to drive the headlamp, based on a position calculated by applying the offset stored in the storage unit.

* * * * *